(12) United States Patent
Toyama et al.

(10) Patent No.: US 11,935,131 B2
(45) Date of Patent: Mar. 19, 2024

(54) INSURANCE AUDIT DEVICE, INSURANCE AUDIT SYSTEM, INSURANCE AUDIT METHOD, AND NON-TRANSITORY COMPUTER READABLE MEDIUM STORING PROGRAM

(71) Applicant: NEC Corporation, Tokyo (JP)

(72) Inventors: Hidehisa Toyama, Tokyo (JP); Wataru Koyanagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/762,862

(22) PCT Filed: Sep. 30, 2019

(86) PCT No.: PCT/JP2019/038513
§ 371 (c)(1),
(2) Date: Mar. 23, 2022

(87) PCT Pub. No.: WO2021/064792
PCT Pub. Date: Apr. 8, 2021

(65) Prior Publication Data
US 2022/0343434 A1    Oct. 27, 2022

(51) Int. Cl.
*G06Q 40/08*    (2012.01)
(52) U.S. Cl.
CPC .................... *G06Q 40/08* (2013.01)
(58) Field of Classification Search
CPC ...................................... G06Q 40/08
USPC ............................................................ 705/4
See application file for complete search history.

(56) References Cited

U.S. PATENT DOCUMENTS

| | | | |
|---|---|---|---|
| 10,699,018 B2 * | 6/2020 | Hamby | G06F 21/577 |
| 11,373,245 B1 * | 6/2022 | Sankovsky | G06Q 40/08 |
| 2016/0110819 A1 * | 4/2016 | Abramowitz | H04L 63/1416 |
| | | | 705/4 |
| 2016/0112445 A1 * | 4/2016 | Abramowitz | G06Q 40/08 |
| | | | 726/23 |
| 2021/0201423 A1 * | 7/2021 | Speranza | G06F 3/048 |

FOREIGN PATENT DOCUMENTS

| | | |
|---|---|---|
| JP | 2002-083121 A | 3/2002 |
| JP | 2004-094698 A | 3/2004 |
| JP | 2005-339336 A | 12/2005 |

OTHER PUBLICATIONS

International Search Report for PCT Application No. PCT/JP2019/038513, dated Dec. 24, 2019.

* cited by examiner

*Primary Examiner* — Robert R Niquette (57) ABSTRACT

An insurance audit device, an insurance audit system, an insurance audit method, and a program for appropriately and easily conducting an audit related to cyber insurance are provided. An insurance audit device includes a monitoring result acquisition unit for acquiring a result of monitoring communication of a network in operation from a monitoring device configured to monitor the communication of the network, the network being a target for an audit related to insurance and an insurance audit unit for conducting the audit related to the insurance covering the network based on the result of monitoring in a predetermined period of time.

9 Claims, 5 Drawing Sheets

INSURANCE AUDIT DEVICE, INSURANCE AUDIT SYSTEM, INSURANCE AUDIT METHOD, AND NON-TRANSITORY COMPUTER READABLE MEDIUM STORING PROGRAM

This application is a National Stage Entry of PCT/JP2019/038513 filed on Sep. 30, 2019, the contents of all of which are incorporated herein by reference, in their entirety.

TECHNICAL FIELD

The present disclosure relates to an insurance audit device, an insurance audit system, an insurance audit method, and a non-transitory computer readable medium storing a program.

BACKGROUND ART

Cyber attacks have increased in recent years. Therefore, cyber insurance is attracting attention. In connection with this, techniques related to an audit in order to allow purchase of cyber insurance have been proposed. For example, Patent Literature 1 discloses a damage insurance system for measuring a security level based on results of a questionnaire answered by an insurance applicant. If the security level is adequate, the insurance applicant is allowed to purchase insurance. Patent Literature 2 discloses a system for determining whether or not to accept an application from an insurance applicant based on a result of an external investigation on computer equipment of the insurance applicant.

CITATION LIST

Patent Literature

Patent Literature 1: Japanese Unexamined Patent Application Publication No. 2005-339336
Patent Literature 2: Japanese Unexamined Patent Application Publication No. 2004-094698

SUMMARY OF INVENTION

Technical Problem

In the above-mentioned literature, since the audit related to the insurance is conducted based on the results of the questionnaire or the result of the external investigation, it requires time and effort to conduct the audit and also difficult to conduct an audit with an appropriate consideration being given about a communication status of the insurance applicant.

The present disclosure has been made to solve such problems and an object of the present disclosure is to provide an insurance audit device, an insurance audit system, an insurance audit method, and a program for appropriately and easily conducting an audit related to cyber insurance.

Solution to Problem

In a first example aspect of the present disclosure, an insurance audit device includes:
monitoring result acquisition means for acquiring a result of monitoring communication of a network in operation from a monitoring device, the monitoring device being configured to monitor the communication of the network, the network being a target for an audit related to insurance; and
insurance audit means for conducting the audit related to the insurance covering the network based on the result of monitoring in a predetermined period of time.

In a second example aspect of the present disclosure, an insurance audit system includes:
a monitoring device configured to monitor communication of a network, the network being a target for an audit related to insurance; and
an insurance audit device.

The insurance audit device includes:
monitoring result acquisition means for acquiring a result of monitoring communication of the network in operation from the monitoring device; and
insurance audit means for conducting the audit related to the insurance covering the network based on the result of monitoring in a predetermined period of time.

In a third example aspect of the present disclosure, an insurance audit method includes:
acquiring, by an insurance audit device, a result of monitoring communication of a network in operation from a monitoring device, the monitoring device being configured to monitor the communication of the network, the network being a target for an audit related to insurance; and
conducting, by an insurance audit device, the audit related to the insurance covering the network based on the result of monitoring in a predetermined period of time.

In a fourth example aspect of the present disclosure, a program causes a computer to execute:
a monitoring result acquisition step of acquiring a result of monitoring communication of a network in operation from a monitoring device, the monitoring device being configured to monitor the communication of the network, the network being a target for an audit related to insurance; and
an insurance audit step of conducting the audit related to the insurance covering the network based on the result of monitoring in a predetermined period of time.

Advantageous Effects of Invention

According to the present disclosure, it is possible to provide an insurance audit device, an insurance audit system, an insurance audit method, and a program for appropriately and easily conducting an audit related to cyber insurance.

DESCRIPTION OF EMBODIMENTS

In order to clarify the explanation, the following description and drawings are omitted and simplified as appropriate. In each of the drawings, the same elements are given the same reference signs, and repeated explanations are omitted as necessary.

Figure 1:
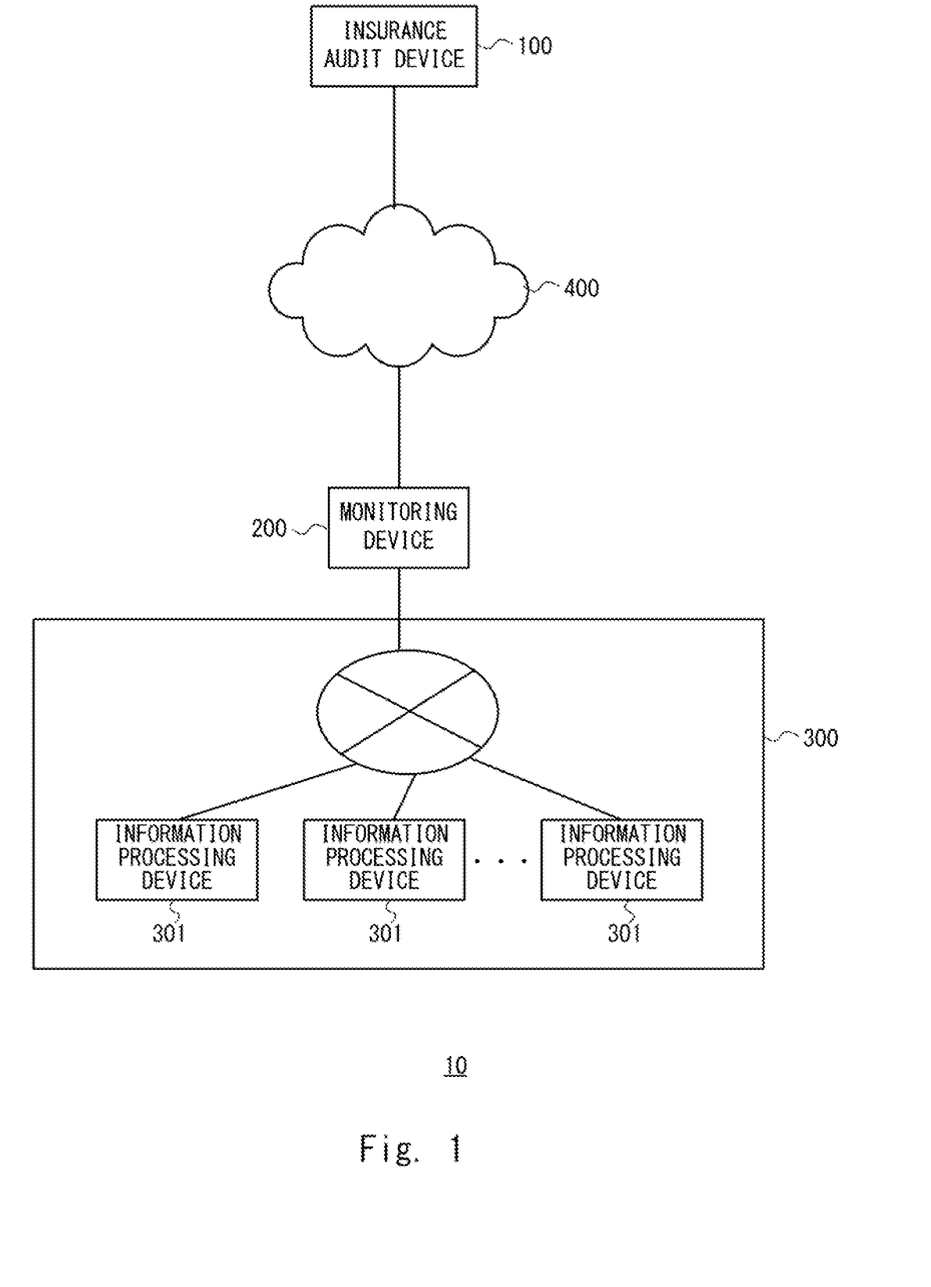
FIG. 1 is a schematic diagram showing an example of a configuration of an insurance audit system according to an example embodiment.

FIG. 1 is a schematic diagram showing an example of a configuration of an insurance audit system 10 according to an example embodiment.

The insurance audit system 10 includes an insurance audit device 100, a monitoring device 200, and an intra-organization network 300, and conducts an audit related to purchase of insurance covering the intra-organization network 300 based on a result of monitoring by the monitoring device 200. The insurance audit device 100 and the monitoring device 200 are communicably connected to each other via a communication network 400 such as the Internet.

As shown in FIG. 1, for example, the intra-organization network 300 includes a plurality of information processing devices 301 such as a personal computer and a server, and is a network belonging to an organization such as a company. In this example embodiment, the intra-organization network 300 is to be covered by cyber insurance.

The monitoring device 200 is installed between the communication network 400 and the intra-organization network 300, and relays communication between the intra-organization network 300 and the communication network 400 and monitors communication. The monitoring device 200 is, for example, a device (such as a UTM (Unified Threat Management) device) having a function as an IDS (Intrusion Detection System) or IPS (Intrusion Prevention System).

The insurance audit device 100 receives a monitoring result from the monitoring device 200 and conducts an audit related to purchase of insurance and is, for example, a server device.

In the insurance audit system 10, the monitoring device 200 monitors communication performed by the intra-organization network 300 actually in operation. Then, the insurance audit device 100 conducts an audit related to insurance covering the intra-organization network 300 based on an actual communication status acquired as the monitoring result. The insurance audit device 100 conducts an audit related to insurance based on the monitoring result of a predetermined period of time (e.g., for a few weeks).

Figure 2:
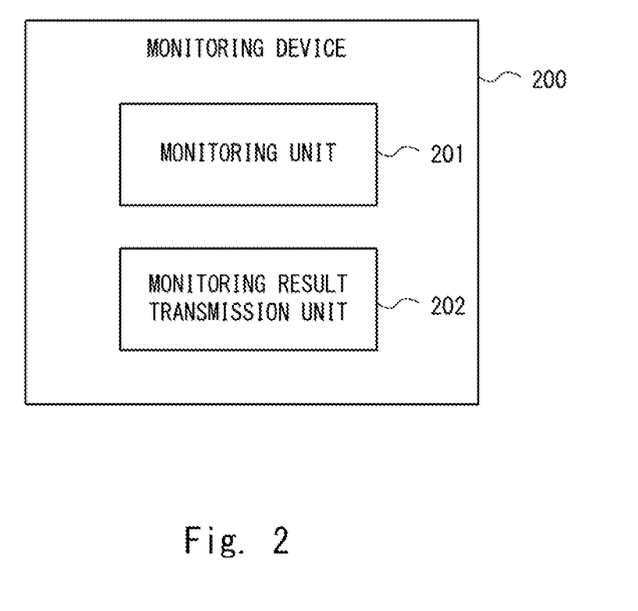
FIG. 2 is a block diagram showing an example of a functional configuration of a monitoring device according to the example embodiment.

FIG. 2 is a block diagram showing an example of a functional configuration of the monitoring device 200. As shown in FIG. 2, the monitoring device 200 includes a monitoring unit 201 and a monitoring result transmission unit 202.

The monitoring unit 201 monitors communication performed by the intra-organization network 300 actually in operation. That is, the monitoring unit 201 monitors the communication of the network for which an audit related to the insurance is to be conducted. In other words, the monitoring unit 201 monitors communication between the intra-organization network 300 and the communication network 400 (the Internet) which is an external network of the intra-organization network 300. By monitoring the communication, the monitoring unit 201 acquires feature information of the communication such as a communication source, a communication destination, a communication protocol, and a communication content for each communication. The monitoring unit 201 may detect communication in which the feature information satisfies a specific condition. This detection may be implemented by a detection function of the IDS or IPS. For example, the monitoring unit 201 refers to a database in which specific conditions are stored to detect an occurrence of communication satisfying the specific condition. The specific condition may be a condition for detecting an occurrence of a predetermined communication event, which will be described later, communication for accessing a predetermined website, or communication by a predetermined application. The database may be included in the monitoring device 200 or another device.

The monitoring result transmission unit 202 transmits the monitoring result acquired by the monitoring unit 201 to the insurance audit device 100. The monitoring result transmission unit 202 transmits, in particular, the monitoring result of the communication from the intra-organization network 300 to the communication network 400. This is to diagnose a security risk present in the intra-organization network 300 in the insurance audit device 100. As a result of the monitoring, the monitoring result transmission unit 202 may transmit the feature information for all communication from the intra-organization network 300 to the communication network 400, or may transmit the feature information of communication satisfying the specific condition described above. Note that the monitoring result transmission unit 202 may transmit information indicating that communication satisfying the specific condition has occurred, instead of transmitting the feature information of the communication satisfying the specific condition.

Figure 3:
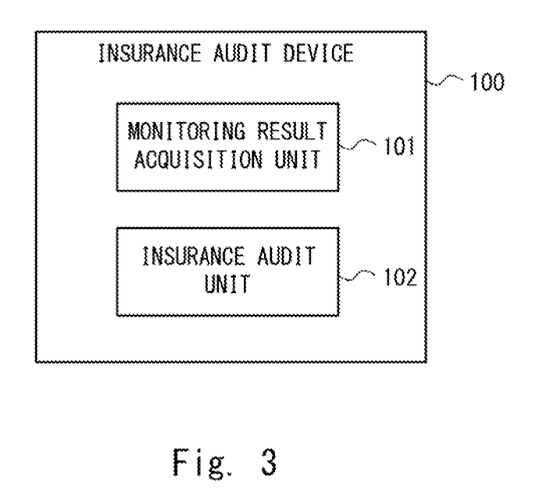
FIG. 3 is a block diagram showing an example of a functional configuration of an insurance audit device according to the example embodiment.

FIG. 3 is a block diagram showing an example of a functional configuration of the insurance audit device 100. As shown in FIG. 3, the insurance audit device 100 includes a monitoring result acquisition unit 101 and an insurance audit unit 102.

The monitoring result acquisition unit 101 acquires a result of monitoring the communication of the intra-organization network 300 in operation from the monitoring device 200.

The insurance audit unit 102 conducts an audit related to the insurance covering the intra-organization network 300 based on the monitoring result of the predetermined period of time acquired by the monitoring result acquisition unit 101. The insurance audit unit 102 may output an audit result. That is, the insurance audit unit 102 may transmit the audit result to another device or display it on a display or the like. Note that the audit result acquired by the insurance audit unit 102 may be used as a provisional audit for an insurance contract. That is, a final audit for the insurance contract may be conducted by another device or an insurance personnel with reference to the audit result acquired by the insurance audit unit 102 and other information.

The insurance audit unit 102 may, for example, conduct an audit based on an occurrence status of communication corresponding to a predetermined communication event. Specifically, the predetermined communication event means, for example, an event related to a security incident. An event related to a security incident includes not only an event corresponding to the security incident, but also an event suspected of being the security incident. In addition, an event related to the security incident may be an event for which an insurance claim is to be paid if the insurance is purchased. The detection of the predetermined communication event is determined, for example, by referring to a database in which specific conditions corresponding to the predetermined communication event are stored and determining whether or not the feature information acquired in the monitoring satisfies the specific condition. Note that the detection of a communication event corresponding to the predetermined communication event may be determined by the insurance audit unit 102 or the monitoring unit 201 of the monitoring device 200.

By conducting an audit based on the occurrence status of communication corresponding to the predetermined communication event, it is possible to conduct an audit in consideration of whether or not a security threat is already present in the intra-organization network 300.

The insurance audit unit 102 may conduct an audit, for example, based on the occurrence status of communication for accessing a predetermined website. Here, the predetermined website is, for example, a website (e.g., game websites, adult websites, etc.) that is not required for the business of a user using the intra-organization network 300. Note that websites corresponding to the predetermined website are defined in advance according to the business contents of the organization using the intra-organization network 300. Detection of communication accessing the predetermined website is determined, for example, by referring to a database in which specific conditions corresponding to access to such a website are stored and determining whether or not the feature information acquired in the monitoring satisfies the specific condition. Note that detection of communication accessing the predetermined website may be determined by the insurance audit unit 102 or the monitoring unit 201 of the monitoring device 200.

By conducting an audit based on the occurrence status of the communication for accessing the predetermined website, it is possible to detect the communication other than a business purpose of the user using the intra-organization network 300. It is thus possible to conduct an audit in consideration of the security awareness of the user who uses the intra-organization network 300 and a management structure of the intra-organization network 300.

The insurance audit unit 102 may conduct an audit based on, for example, the occurrence status of communication by a predetermined application. Here, the predetermined website is, for example, an application (e.g., game apps, Social Networking Service (SNS) apps, etc.) that is not required for the business of the user using the intra-organization network 300. Note that applications corresponding to the predetermined application are defined in advance according to the business contents of the organization using the intra-organization network 300. Detection of communication performed by the predetermined application is determined, for example, by referring to a database in which specific conditions corresponding to such communication are stored and determining whether or not the feature information acquired in the monitoring satisfies the specific condition. Note that detection of communication performed by a predetermined application may be determined by the insurance audit unit 102 or the monitoring unit 201 of the monitoring device 200.

By conducting an audit based on the occurrence status of the communication performed by the predetermined application, it is possible to detect the use of an application other than a business purpose of the user using the intra-organization network 300. It is thus possible to conduct an audit in consideration of the security awareness of the user who uses the intra-organization network 300 and a management structure of the intra-organization network 300.

The insurance audit unit 102 may conduct an audit based on, for example, an opening status of a communication port of the information processing device 301 in the intra-organization network 300. The insurance audit unit 102 may perform, for example, a port scan to check the opening status of the communication port. The insurance audit unit 102 may, for example, check the opening status of a port that is not required for the business of the user using the intra-organization network 300.

By conducting an audit based on the opening status of the communication port, the audit can be conducted in consideration of the management structure of the intra-organization network 300.

The insurance audit unit 102 may conduct an audit based on any one of the above-mentioned audit items (predetermined communication events, websites, applications, and communication ports), or may conduct an audit by combining two or more of the audit items.

The insurance audit unit 102 conducts an audit to determine, for example, whether or not to allow purchase of the insurance based on the results of the audit of the above-mentioned audit items, but may determine insurance premiums. The insurance audit unit 102 conducts an audit to determine whether or not to allow purchase of the insurance or determine the insurance premium by using, for example, a threshold. For example, the insurance audit unit 102 may conduct an audit to determine whether or not to allow purchase of the insurance or determine the insurance premium based on whether or not the number of communications corresponding to the predetermined communication event exceeds a predetermined threshold. Similarly, the insurance audit unit 102 may conduct an audit to determine whether or not to allow purchase of the insurance or determine the insurance premium based on whether or not the number of communications accessing the predetermined website exceeds a predetermined threshold. In addition, the insurance audit unit 102 may conduct an audit to determine whether or not to allow purchase of the insurance or determine the insurance premium based on whether or not the number of communications performed by the predetermined application exceeds a predetermined threshold. Further, the insurance audit unit 102 may conduct an audit to determine whether or not to allow purchase of the insurance or determine the insurance premium based on whether or not the number of open ports not required for the business of the user exceeds a predetermined threshold. For example, if the number of occurrences of above-mentioned communication or the number of open ports exceeds a threshold, an audit result indicating that purchase of the insurance is not allowed may be output or a higher insurance premium may be calculated. It is needless to say that these are only examples, and a specific audit method may be appropriately set.

Figure 4:
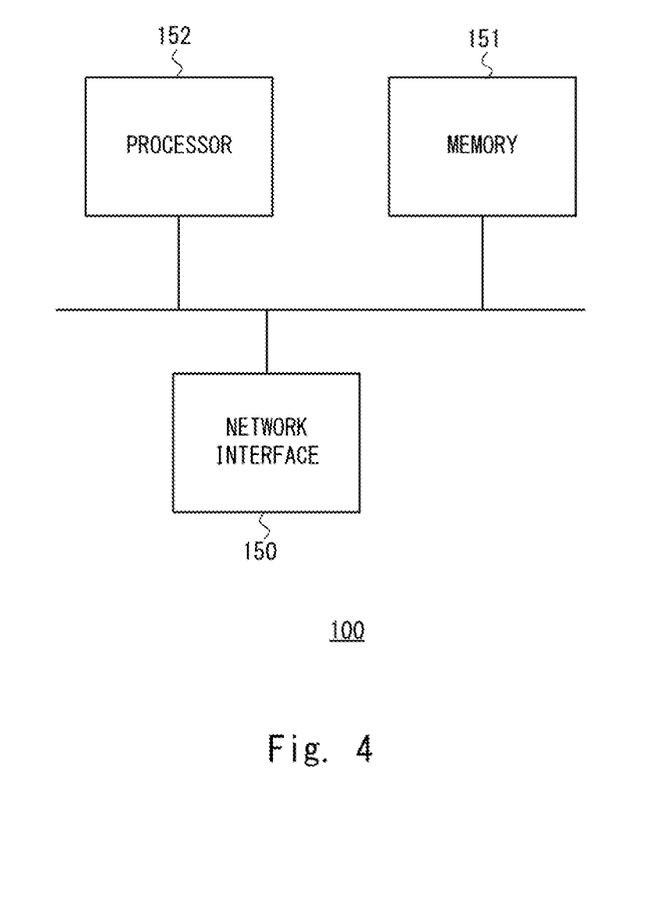
FIG. 4 is a schematic diagram showing an example of a hardware configuration of the insurance audit device according to the example embodiment.

FIG. 4 is a schematic diagram showing an example of a hardware configuration of the insurance audit device 100. As shown in FIG. 4, the insurance audit device 100 includes a network interface 150, a memory 151, and a processor 152.

The network interface 150 is used to communicate with any other device, such as the monitoring device 200. The network interface 150 may include, for example, a network interface card (NIC).

The memory 151 is composed of, for example, a combination of a volatile memory and a non-volatile memory. The memory 151 is used to store software (computer programs), including one or more instructions to be executed by the processor 152, data used for various processing of the insurance audit device 100, and the like.

The processor 152 reads and executes the software (computer programs) from the memory 151 to perform processing of each of the components shown in FIG. 3. Specifically, the processor 152 performs processing of the monitoring result acquisition unit 101 and the insurance audit unit 102.

The processor 152 may be, for example, a microprocessor, an MPU (Micro Processor Unit), or a CPU (Central Processing Unit). The processor 152 may include a plurality of processors.

In this way, the insurance audit device 100 has a function as a computer.

The monitoring device 200 also has a hardware configuration as shown in FIG. 4. That is, the processing of the monitoring device 200 is implemented by, for example, execution of a program by a processor. Specifically, the processor of the monitoring device 200 performs processing of the monitoring unit 201 and the monitoring result transmission unit 202. In this way, the monitoring device 200 has a function as a computer.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 5:
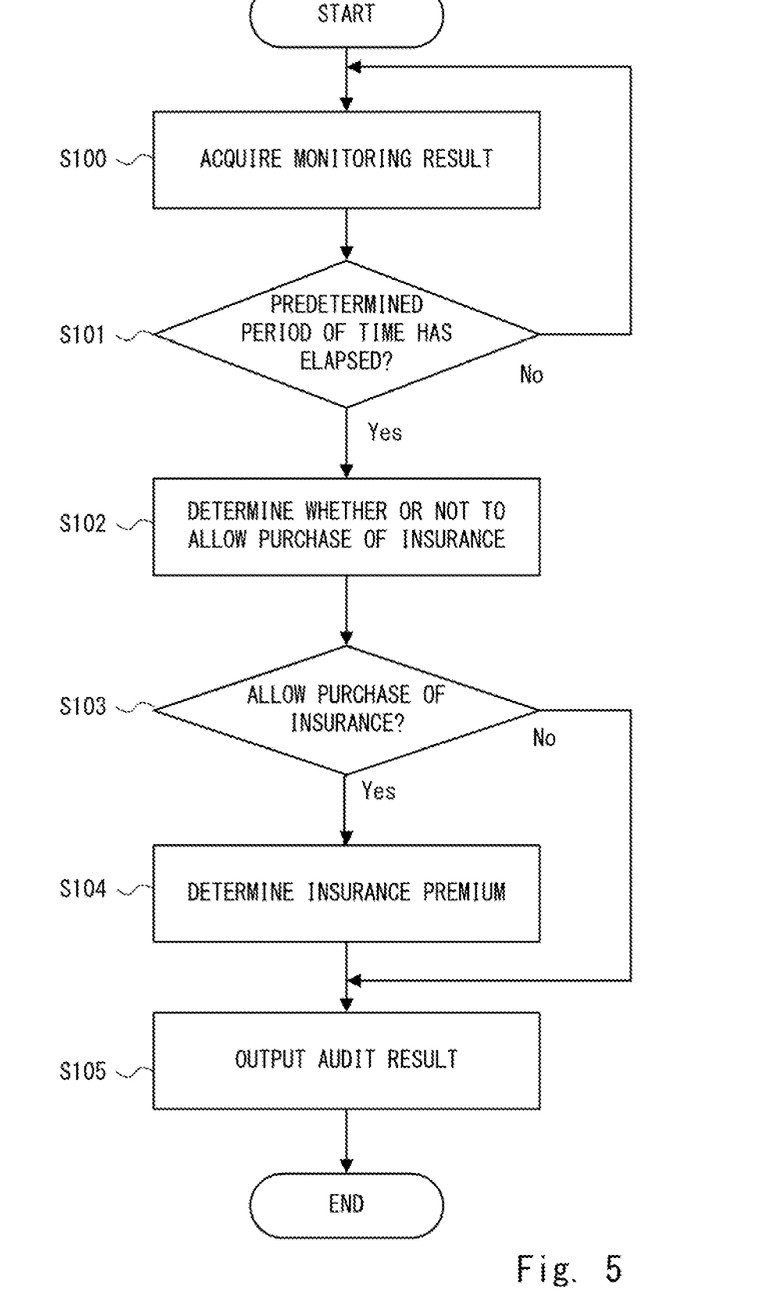
FIG. 5 is a flowchart showing an example of an operation of the insurance audit device according to the example embodiment.

Next, an operation of the insurance audit device 100 will be described. FIG. 5 is a flowchart showing an example of the operation of the insurance audit device 100. An example of the operation of the insurance audit unit 102 will be described below with reference to the flowchart of FIG. 5.

In Step S100, the monitoring result acquisition unit 101 acquires the monitoring result from the monitoring device 200. The acquisition of the monitoring result is repeated until a predetermined period of time elapses (No in Step S101). Meanwhile, in the monitoring device 200, monitoring by the monitoring unit 201 and transmission of the monitoring result by the monitoring result transmission unit 202 are continuously performed. When the predetermined period of time has elapsed, that is, when the monitoring result of the predetermined period of time is acquired, the processing proceeds to Step S102 (Yes in Step S101).

In Step S102, the insurance audit unit 102 determines whether or not to allow purchase of the insurance based on the acquired monitoring result. When the purchase is allowed (Yes in Step S103), the processing proceeds to Step S104, while when the purchase is not allowed (No in Step S103), the processing proceeds to Step S105.

In Step S104, the insurance audit unit 102 determines the insurance premium based on the acquired monitoring result.

In Step S105, the insurance audit unit 102 outputs the audit result. That is, the insurance audit unit 102 outputs a determination as to whether or not to allow purchase of the insurance. The insurance audit unit 102 also outputs the insurance premium when the purchase of the insurance is allowed.

The example embodiment has been described above. According to the insurance audit system 10, the audit related to the insurance is automatically conducted based on the actual communication status of the intra-organization network 300 in operation. Therefore, the time and effort required for the audit can be reduced, and the audit can be conducted by appropriately considering a present state of communication of an insurance applicant. In other words, it is possible to appropriately and easily conduct an audit related to cyber insurance.

Although the present disclosure has been described with reference to the above example embodiments, the present disclosure is not limited thereto. Various changes can be made to the configuration and details of the disclosure within the scope of the disclosure that can be understood by those skilled in the art.

The whole or part of the example embodiment disclosed above can be described as, but not limited to, the following supplementary notes.

(Supplementary Note 1)

An insurance audit device comprising:
 monitoring result acquisition means for acquiring a result of monitoring communication of a network in operation from a monitoring device, the monitoring device being configured to monitor the communication of the network, the network being a target for an audit related to insurance; and
 insurance audit means for conducting the audit related to the insurance covering the network based on the result of monitoring in a predetermined period of time.

(Supplementary Note 2)

The insurance audit device according to Supplementary note 1, wherein
 the insurance audit means conducts an audit to determine whether or not to allow purchase of the insurance.

(Supplementary Note 3)

The insurance audit device according to Supplementary note 1 or 2, wherein
 the insurance audit means determines an insurance premium.

(Supplementary Note 4)

The insurance audit device according to any one of Supplementary notes 1 to 3, wherein
 the insurance audit means conducts the audit based on an occurrence status of communication corresponding to a predetermined communication event.

(Supplementary Note 5)

The insurance audit device according to any one of Supplementary notes 1 to 4, wherein
 the insurance audit means conducts the audit based on an occurrence status of communication for accessing a predetermined website.

(Supplementary Note 6)

The insurance audit device according to any one of Supplementary notes 1 to 5, wherein
 the insurance audit means conducts the audit based on an occurrence status of communication by a predetermined application.

(Supplementary Note 7)

The insurance audit device according to any one of Supplementary notes 1 to 6, wherein
 the insurance audit means further conducts the audit based on an opening status of a communication port of a information processing device in the network.

(Supplementary Note 8)

An insurance audit system comprising:
 a monitoring device configured to monitor communication of a network, the network being a target for an audit related to insurance; and
 an insurance audit device, wherein the insurance audit device comprises:
monitoring result acquisition means for acquiring a result of monitoring communication of the network in operation from the monitoring device; and
insurance audit means for conducting the audit related to the insurance covering the network based on the result of monitoring in a predetermined period of time.

(Supplementary Note 9)

The insurance audit system according to Supplementary note 8, wherein
the insurance audit means conducts an audit to determine whether or not to allow purchase of the insurance.

(Supplementary Note 10)

The insurance audit system according to Supplementary note 8 or 9, wherein
the insurance audit means determines an insurance premium.

(Supplementary Note 11)

An insurance audit method comprising:
acquiring, by an insurance audit device, a result of monitoring communication of a network in operation from a monitoring device, the monitoring device being configured to monitor the communication of the network, the network being a target for an audit related to insurance; and
conducting, by an insurance audit device, the audit related to the insurance covering the network based on the result of monitoring in a predetermined period of time.

(Supplementary Note 12)

A non-transitory computer readable medium storing a program for causing a computer to execute:
a monitoring result acquisition step of acquiring a result of monitoring communication of a network in operation from a monitoring device, the monitoring device being configured to monitor the communication of the network, the network being a target for an audit related to insurance; and
an insurance audit step of conducting the audit related to the insurance covering the network based on the result of monitoring in a predetermined period of time.

REFERENCE SIGNS LIST

10 INSURANCE AUDIT SYSTEM
100 INSURANCE AUDIT DEVICE
101 MONITORING RESULT ACQUISITION UNIT
102 INSURANCE AUDIT UNIT
150 NETWORK INTERFACE
151 MEMORY
152 PROCESSOR
200 MONITORING DEVICE
201 MONITORING UNIT
202 MONITORING RESULT TRANSMISSION UNIT
300 INTRA-ORGANIZATION NETWORK
301 INFORMATION PROCESSING DEVICE
400 COMMUNICATION NETWORK

What is claimed is:

1. An insurance audit device comprising:
at least one memory storing program instructions; and
at least one processor configured to execute the instructions stored in the memory to:
acquire a monitoring result from a monitoring device, wherein
the monitoring result pertaining to communications occurring within a predetermined period of time between a plurality of information processing devices of an intra-organization network and a communication network, the monitoring result identifying which of the communications satisfy specific conditions as to one or multiple of communication source, communication destination, communication protocol, and communication content, and
the monitoring device is one or more of a unified threat management (UTM) device, an intrusion detection system (IDS), and an intrusion prevention system (IPS), and is installed within a communication path between the intra-organization network and the communication network; and
conduct an audit related to insurance covering the intra-organization network based on the monitoring result, wherein the monitoring device is installed to monitor the communications for conducting the audit related to the insurance based on the monitoring result.

2. The insurance audit device according to claim 1, wherein
the processor is further configured to execute the instructions to determine whether or not to allow purchase of the insurance, based on the audit.

3. The insurance audit device according to claim 1, wherein
the processor is further configured to execute the instructions to determine an insurance premium.

4. The insurance audit device according to claim 1, wherein
the processor is further configured to execute the instructions to conduct the audit based on an occurrence status of the communications for accessing a predetermined website.

5. An insurance audit system comprising:
a monitoring device installed within a communication path between an intra-organization network comprising a plurality of information processing devices and a communication network, the monitoring device being one or more of a unified threat management (UTM) device, an intrusion detection system (IDS), and an intrusion prevention system (IPS), wherein the monitoring device is configured to monitor each of a plurality of communications occurring within a predetermined period of time between the information processing devices of the intra-organization network and the communication network and identifying which of the communications satisfy specific conditions as to one or multiple of communication source, communication destination, communication protocol, and communication content;
and an insurance audit device configured to:
acquire, from the monitoring device, a monitoring result pertaining to the communications occurring within the predetermined of time, the monitoring result comprising the identified communications that satisfy the specific conditions, as occurrences of predetermined communication events;
and conduct an audit related to insurance covering the intra-organization network based on the monitoring result, wherein the monitoring device is installed to monitor the communications for conducting the audit related to the insurance based on the monitoring result.

6. The insurance audit system according to claim 5, wherein
the insurance audit device is further configured to determine whether or not to allow purchase of the insurance, based on the audit.

7. The insurance audit system according to claim 5, wherein
the insurance audit device is further configured to determine an insurance premium.

8. An insurance audit method comprising:
installing a monitoring device within a communication path between an intra-organization network comprising a plurality of information processing devices and a communication network, the monitoring device being one or more of a unified threat management (UTM) device, an intrusion detection system (IDS), and an intrusion prevention system (IPS);
monitoring, by the monitoring device, each of a plurality of communications occurring within a predetermined period of time between the information processing devices of the intra-organization network and the communication network and identifying which of the communications satisfy specific conditions as to one or multiple of communication source, communication destination, communication protocol, and communication content;
acquiring, by an insurance audit device and from the monitoring device, a monitoring result pertaining to the communications occurring within the predetermined of time, the monitoring result comprising the identified communications that satisfy the specific conditions, as occurrences of predetermined communication events and
conducting, by the insurance audit device, an audit related to insurance covering the intra-organization network based on the monitoring result, wherein the monitoring device is installed to monitor the communications for conducting the audit related to the insurance based on the monitoring result.

9. A non-transitory computer readable medium storing program executable by an insurance audit device to:
acquire a monitoring result from a monitoring device, wherein
the monitoring result pertaining to communications occurring within a predetermined period of time between a plurality of information processing devices of an intra-organization network and a communication network, the monitoring result identifying which of the communications satisfy specific conditions as to one or multiple of communication source, communication destination, communication protocol, and communication content, and
the monitoring device is one or more of a unified threat management (UTM) device, an intrusion detection system (IDS), and an intrusion prevention system (IPS), and is installed within a communication path between the intra-organization network and the communication network; and
conduct an audit related to insurance covering the intra-organization network based on the monitoring result,
wherein the monitoring device is installed to monitor the communications for conducting the audit related to the insurance based on the monitoring result.

* * * * *